United States Patent Office 2,750,232
Patented June 12, 1956

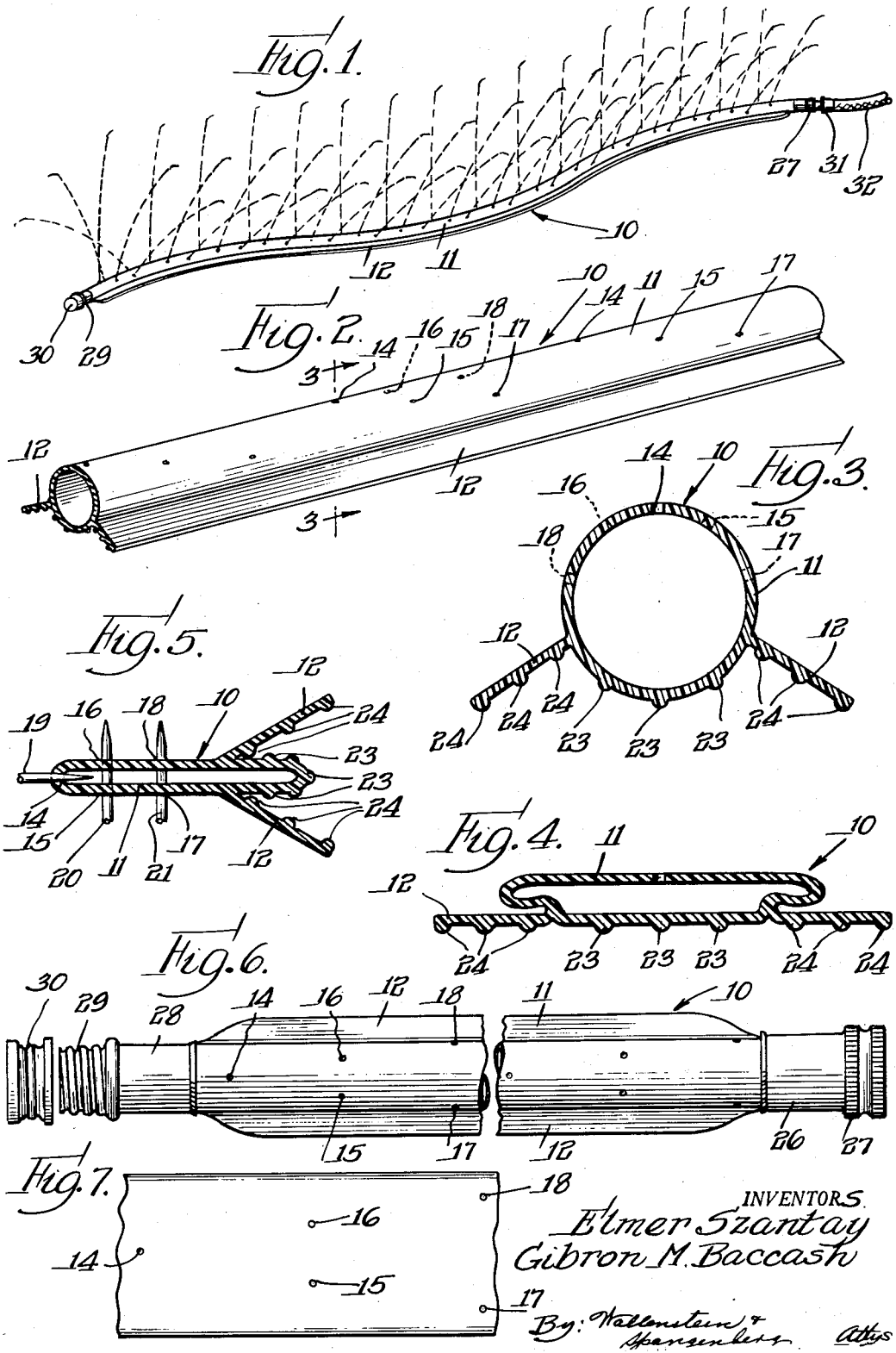
June 12, 1956    E. SZANTAY ET AL    2,750,232
LAWN SOAKER
Filed Sept. 25, 1953
INVENTORS
Elmer Szantay
Gibron M. Baccash
By Wallenstein & Spansenless Attys

2,750,232
LAWN SOAKER

Elmer Szantay, Chicago, and Gibron M. Baccash, Evanston, Ill., assignors to Sandee Mfg. Co., a corporation of Illinois Application September 25, 1953, Serial No. 382,248

6 Claims. (Cl. 299—104)

This invention is directed to an elongated flexible tubular type of lawn soaker having a plurality of perforations through which the water is sprayed for sprinkling and soaking a lawn. Such a lawn soaker has certain definite advantages in that contour sprinkling or soaking may be readily obtained, uniform coverage is assured and the water is delivered in a fine spray. However, considerable difficulty has been encountered in this type of lawn soaker because it is difficult to so position the lawn soaker so as to maintain the perforations in an upwardly facing direction. If the perforations should face downwardly serious erosion and washing away of the soil is brought about.

The principal object of this invention is to provide an improved lawn soaker of the flexible tubular type which eliminates the beforementioned difficulties and retains all of the advantages of such lawn soakers, which at all times maintains the spraying perforations in an upwardly facing direction, which is simple to use and position properly on the lawn, which may be readily collapsed for handling and storage purposes, which is simply extended and placed in proper operation when water pressure is applied thereto, and which is inexpensive to manufacture.

Briefly, the lawn soaker of this invention includes a hollow elongated flexible and collapsible synthetic plastic tube which is substantially cylindrical in configuration when extended by water pressure therein. The tube is integrally provided on opposite sides below the center thereof with longitudinally arranged and downwardly and outwardly extending flexible synthetic plastic fins for supporting and positioning the extended tube in upright position on the lawn. The upper portion of the tube above the fins is provided with a plurality of perforations therethrough for spraying water upwardly and outwardly from within the tube.

The flexible synthetic plastic lawn soaker of this invention may be readily collapsed for ease in handling and storage. When, however, water pressure is applied thereto, the flexible tube is extended and the fins support and position the extended tube with the perforations facing upwardly for proper spraying and washing away of the soil is effectively prevented. The lower portion of the tube between the fins and the bottom sides of the fins are integrally provided with a plurality of longitudinally extending ribs for strengthening the same and aiding in supporting and positioning the tube in upright position on the lawn. The perforations are preferably arranged in repeating patterns along the tube to provide for even distribution of water from the lawn soaker. The lawn soaker is also provided with fittings for closing the ends of the tube and for supplying water under pressure into the tube.

Further objects of this invention reside in the details of construction of the lawn soaker and in the cooperative relationships between the component parts thereof.

Other objects and advantages of this invention will become apparent to those skilled in the art upon reference to the accompanying specification, claims and drawing in which: Fig. 1 is a perspective view illustrating the lawn soaker of this invention in use; Fig. 2 is a perspective view of a portion of the lawn soaker and shown in extended condition; Fig. 3 is a vertical sectional view through the lawn soaker taken substantially along the line 3—3 of Fig. 2; Fig. 4 is a sectional view similar to Fig. 3 but illustrating the lawn soaker in collapsed condition; Fig. 5 is a perspective view similar to Figs. 3 and 4 but illustrating the manner of forming the perforations therein; Fig. 6 is a top plan view of the lawn soaker in extended condition; and Fig. 7 is a top plan view of the lawn soaker but in collapsed condition.

The lawn soaker of this invention is generally designated at 10 and it includes a hollow, elongated, flexible, synthetic plastic tube 11. The tube 11 may assume a collapsed condition as indicated in Figs. 4 and 5 and it may assume a substantially cylindrical configuration when it is extended by water pressure therein as illustrated in Figs. 2 and 3. The tube 11 is integrally provided on opposite sides below the center thereof with longitudinally arranged and downwardly and outwardly extending flexible, synthetic plastic fins 12. These fins 12 operate to support and position the extended tube 11 in upright position on the lawn.

The upper portion of the tube 11 above the fins 12 is provided with a plurality of perforations therethrough for spraying water upwardly and outwardly from within the tube. These perforations are preferably arranged in repeating patterns along the tube. Each pattern of perforations includes a hole 14 coinciding with a vertical plane through the tube, a pair of holes 15 and 16 equally spaced from said vertical plane, and a further pair of holes 17 and 18 equally spaced a greater distance from said vertical plane. In forming the perforations in the upper portion of the tube the tube is preferably folded in the manner indicated in Fig. 5 and passed through a suitable die provided with perforators 19, 20 and 21. The perforator 19 forms the hole 14, the perforator 20 forms the holes 15 and 16 and the perforator 21 forms the holes 17 and 18. After one pattern of perforations is produced by the perforators 19, 20 and 21 the tube is then advanced through the die and another pattern of perforations is produced. This operation is continued until the lawn soaker is perforated throughout substantially its length. The perforations 14 spray water substantially vertically, the perforations 15 and 16 spray water at an angle with respect to the vertical and the perforations 17 and 18 spray water at a greater angle with respect to the vertical. The relative locations of the perforations are illustrated in Figs. 2, 3, and 6. By reason of these perforations water is uniformly sprayed over the desired area. The fins 12 operate to maintain the perforations in an upwardly facing direction for proper spraying or sprinkling and washing away of the soil is therefore effectively prevented.

The lower portion of the tube 11 between the fins 12 is integrally provided with a plurality of longitudinally extended ribs 23. In a like manner the bottom sides of the fins 12 are also integrally provided with a plurality of longitudinally extended ribs 24. These ribs 23 and 24 operate to strengthen the tube and the fins and aid in supporting and positioning the tube in upright position on the lawn.

One end of the lawn soaker is provided with a suitable fitting 26 having a female connector 27 for connecting the lawn soaker to a male fitting 31 of a hose 32 for supplying water under pressure into the lawn soaker. The other end of the lawn soaker is provided with a fitting 28 having a male connector 29 upon which may be secured a cap 30 for closing this end of the lawn soaker and maintaining pressure in the lawn soaker. If desired, the cap 30 may be removed and another lawn soaker applied to the male connector 29.

The ground soaker may be formed from any suitable flexible and collapsible synthetic plastic material such as vinyl chloride or the like and it is preferably formed by an extrusion molding process. A specific lawn soaker of this invention which has proven successful is one of 25 foot or 50 foot lengths and having a general wall thickness of .030 plus or minus .005 inch, an inside tube diameter of .755 inch and fins ½ inch wide. The fins terminate on a plane tangent with the bottom of the tube and have a span of 1¾ inch. The perforations are formed by perforators having a diameter of .040 inch. The longitudinal spacing between the perforation 14, the perforations 15 and 16, and the perforations 17 and 18 is 1½ inch, and the spacing between the perforations 15 and 16 is ½ inch and the spacing between the perforations 17 and 18 is one inch. The ribs 23 and 24 have a $\frac{1}{64}$ inch radius and are substantially equally spaced apart. The spacing between the ribs on the fins 12 is $\frac{13}{64}$ of an inch and the angle between the other ribs 23 on the tube is 70 degrees. This lawn soaker, so constructed, operates satisfactorily to provide a uniform spray with water pressures as low as 20 pounds per square inch.

The lawn soaker of this invention may be readily collapsed for ease in handling and storage. When, however, water pressure is applied thereto the flexible tube is extended and the fins support and position the extended tube with the perforations facing upwardly for proper spraying and washing away of the soil is effectively prevented. In order to properly position the lawn soaker when it is extended, all that is necessary is to give the same a few shakes and it automatically assumes the correct and proper position. The lawn soaker being flexible may be snaked into substantially any configuration for the purpose of obtaining contour sprinkling and at the same time the perforations always face upwardly.

While for purposes of illustration one form of this invention has been disclosed other forms thereof may become apparent to those skilled in the art upon reference to this disclosure and therefore this invention is to be limited only by the scope of the appended claims.

We claim as our invention:

1. A lawn soaker comprising a single piece elongated, flexible and collapsible extrusion molded synthetic plastic member having a hollow tube portion which has a substantially uniform wall thickness and which is substantially cylindrical in configuration when extended by water pressure therein and having on opposite sides of the tube portion below the center thereof longitudinally arranged and outwardly and downwardly extending fin portions of substantially uniform thickness, the fin portions extending substantially to a horizontal plane tangential to the bottom of the tube portion for supporting and positioning the extended tube portion in upright position on the lawn, the upper part of the tube portion above the fin portions being provided with a plurality of perforations therethrough for spraying water upwardly and outwardly from within the tube portion.

2. A lawn soaker comprising a single piece elongated, flexible and collapsible extrusion molded synthetic plastic member having a hollow tube portion which has a substantially uniform wall thickness, which is substantially cylindrical in configuration when extended by water pressure therein and which may be substantially collapsed when the water pressure therein is relieved for compacting the same for storage purposes and having on opposite sides of the tube portion longitudinally arranged fin portions of substantially uniform thickness extending substantially radially outwardly from the tube portion when the latter is extended by water pressure therein for positioning the extended tube portion in upright position on the lawn, the upper part of the tube portion above the fin portions being provided with a plurality of perforations therethrough for spraying water upwardly and outwardly from within the tube portion.

3. A lawn soaker comprising a single piece elongated, flexible and collapsible extrusion molded synthetic plastic member having a hollow tube portion which has a substantially uniform wall thickness, which is substantially cylindrical in configuration when extended by water pressure therein and which may be substantially collapsed when the water pressure therein is relieved for compacting the same for storage purposes and having on opposite sides of the tube portion longitudinally arranged fin portions of substantially uniform thickness extending outwardly and downwardly from the tube portion when the latter is extended by water pressure therein for positioning the extended tube portion in upright position on the lawn, the upper part of the tube portion above the fin portions being provided with a plurality of perforations therethrough for spraying water upwardly and outwardly from within the tube portion.

4. A lawn soaker comprising a single piece elongated, flexible and collapsible extrusion molded synthetic plastic member having a hollow tube portion which has a substantially uniform wall thickness, which is substantially cylindrical in configuration when extended by water pressure therein and which may be substantially collapsed when the water pressure therein is relieved for compacting the same for storage purposes and having on opposite sides of the tube portion longitudinally arranged fin portions of substantially uniform thickness extending outwardly and downwardly from the tube portion when the latter is extended by water pressure therein for positioning the extended tube portion in upright position on the lawn, the upper part of the tube portion above the fin portions being provided with a plurality of perforations therethrough for spraying water upwardly and outwardly from within the tube portion, the fin portions being integrally provided with a plurality of longitudinally extending ribs for strengthening the same.

5. A lawn soaker comprising a single piece elongated, flexible and collapsible extrusion molded synthetic plastic member having a hollow tube portion which has a substantially uniform wall thickness, which is substantially cylindrical in configuration when extended by water pressure therein and which may be substantially collapsed when the water pressure therein is relieved for compacting the same for storage purposes and having on opposite sides of the tube portion longitudinally arranged fin portions of substantially uniform thickness extending outwardly and downwardly from the tube portion when the latter is extended by water pressure therein for positioning the extended tube portion in upright position on the lawn, the upper part of the tube portion above the fin portions being provided with a plurality of perforations therethrough for spraying water upwardly and outwardly from within the tube portion, the lower part of the tube portion between the fin portions being integrally provided with a plurality of longitudinally extending ribs for strengthening the same and aiding in positioning the tube portion in upright position.

6. A lawn soaker comprising a single piece elongated, flexible and collapsible extrusion molded synthetic plastic member having a hollow tube portion which has a substantially uniform wall thickness, which is substantially cylindrical in configuration when extended by water pressure therein and which may be substantially collapsed when the water pressure therein is relieved for compacting the same for storage purposes and having on opposite sides of the tube portion longitudinally arranged fin portions of substantially uniform thickness extending outwardly and downwardly from the tube portion when the latter is extended by water pressure therein for positioning the extended tube portion in upright position on the lawn, the upper part of the tube portion above the fin portions being provided with a plurality of perforations therethrough for spraying water upwardly and outwardly from within the tube portion, the lower part of the tube portion between the fin portions and the fin portions being provided with a plurality of longitudinally extending ribs for strengthening the same and aiding in positioning the tube portion in upright position.

References Cited in the file of this patent

UNITED STATES PATENTS

| | | |
|---|---|---|
| 2,070,665 | Lepper | Feb. 16, 1937 |
| 2,143,960 | Stalter | Jan. 17, 1939 |
| 2,578,159 | Vance | Dec. 11, 1951 |
| 2,621,075 | Sedar | Dec. 9, 1952 |

FOREIGN PATENTS

| | | |
|---|---|---|
| 46,756 | Switzerland | Mar. 12, 1909 |